Patented Dec. 11, 1951

2,577,867

UNITED STATES PATENT OFFICE 2,577,867

PREPARATION OF BETA-METHYLCROTONALDEHYDE

Norman L. Wendler, Linden, and Harry L. Slates, Cranford, N. J., assignors to Merck & Co., Inc., Rahway, N. J., a corporation of New Jersey No Drawing. Application April 1, 1950,
Serial No. 153,488

9 Claims. (Cl. 260—601)

1

This application relates to an improved method of preparing aldehydes, and more particularly to the preparation of $\beta$-methylcrotonaldehyde.

The unsaturated aldehyde, $\beta$-methylcrotonaldehyde, is an important intermediate which is useful in the synthesis of vitamin A. Unfortunately, while several methods have been described in the literature for preparing this compound, these processes suffer from the disadvantage that the proposed reactions are difficult to carry out on a commercial scale and the desired product is obtained in only very low yields. The classical procedure involves brominating isovaleraldehyde, forming the acetal, dehydrohalogenating, and hydrolyzing the unsaturated acetal (Berichte, 64, 30 (1931)). This procedure is objectionable for several reasons: the preparation of isovaleraldehyde is difficult, the bromination is very difficult to control, yielding a mixture of products from which the desired product is difficult to separate thereby resulting in a low yield of the desired product, and an undesirable high temperature alkaline fusion is required for dehydrohalogenation. A second procedure available involves the dehydration of the hydroxyaldehyde produced by ozonolysis of dimethylallylcarbinol (Annual Reports (Chem. Soc., London) 38, 174 (1941)—British Patent No. 512,465.) This procedure is objectionable because of the hazardous ozonolysis involved, which is not feasible in large-scale operation. A third method involves reacting vinyl chloride to form methyl $\beta$-chlorovinyl ketone, reacting this ketone with methyl magnesium iodide to form dimethyl $\beta$-chlorovinylcarbinol, and treating the carbinol with acid to form $\beta$-methylcrotonaldehyde (J. Chem. Soc., 937 (1946)). This procedure suffers in that the methyl $\beta$-chlorovinyl ketone is extremely difficult to prepare, since there is a considerable polymer formation, and the ketone decomposes readily.

This invention is concerned with an improved method for the preparation of $\beta$-methylcrotonaldehyde which is suitable for the production of this compound on a commercial scale. It is a further object of this invention to provide a means of producing $\beta$-methylcrotonaldehyde in enhanced yields from readily available raw materials. Other objects of our invention will be apparent from the detailed description hereinafter provided.

In accordance with our invention, we have found that $\beta$-methylcrotonaldehyde is conveniently prepared by intimately contacting alkyl $\beta,\beta$-dialkoxypropionates, with a methyl magnesium halide, decomposing the resulting magnesium complex produced to obtain $\beta$-hydroxy isovaleraldehyde dialkyl acetal, and hydrolyzing this acetal to produce the desired unsaturated aldehyde. Our improved process may be represented chemically as follows:

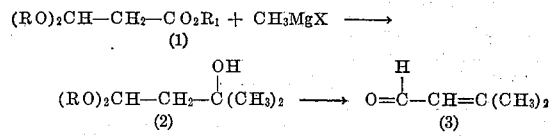

wherein R and $R_1$ are lower alkyl groups and X is iodine or bromine. In the first reaction, the alkyl $\beta,\beta$-dialkoxypropionate (1) is reacted with a methyl magnesium halide to form an intermediate magnesium containing complex product (not shown above) which is decomposed by the addition of the product to water forming the intermediate dialkyl acetal of $\beta$-hydroxyisovaleraldehyde (2). This acetal is then hydrolyzed by treatment with acid resulting in hydrolysis of the alkoxy groups and dehydration to form the desired $\beta$-methyl crotonaldehyde which is readily recovered in pure form by fractional distillation.

The first step of the process is carried out by reacting at least two moles of methyl magnesium halide and one mole of the alkyl $\beta,\beta$-dialkoxypropionate. In actual practice, we prefer to use an excess of about ½ mole of the methyl magnesium halide in order to make certain that the reaction will go to completion. This process is conveniently effected by adding a solution of the alkyl $\beta,\beta$-dialkoxypropionate in ethyl ether to a solution of the methyl magnesium halide in the same solvent medium. Since the reaction of the methyl magnesium halide and the alkyl $\beta,\beta$-dialkoxypropionate is exothermic, it is desirable to provide a means of cooling the reaction mixture during the addition of the alkyl $\beta,\beta$-dialkoxypropionate. In addition, it is also desirable to add the ester at such a rate so as to maintain the temperature of the reaction mixture below about 10° C. After the addition of the ester is complete, the resulting mixture is allowed to stir for several hours at room temperature to complete the formation of the magnesium complex. At this point, the magnesium complex is decomposed by adding the reaction product to water, and the $\beta$-hydroxyisovaleraldehyde dialkyl acetal formed is extracted from the aqueous solution with a water-immiscible solvent such as ether. The ether extracts are then evaporated yielding the desired β-hydroxyisovaleraldehyde dialkyl acetal.

In carrying out this first step of the reaction, either methyl magnesium bromide or methyl magnesium iodide can be used. In actual practice, we prefer to use the methyl magnesium iodide since it is more conveniently prepared than the bromide.

The second step is conveniently carried out by treating the acetal with a strong non-oxidizing acid such as hydrochloric, phosphoric, sulfuric, oxalic, trichloroacetic and the like, resulting in hydrolysis of the alkoxy groups and dehydration to form the β-methylcrotonaldehyde. This reaction is effected for example, by adding dilute aqueous sulfuric acid to a solution of the acetal in ethanol, warming the resulting mixture to about 60–80° C. until turbidity occurs, and then allowing this mixture to stand at room temperature until the reaction is complete. The β-methylcrotonaldehyde resulting from this reaction is contained in an upper oily layer of the mixture, and is readily extracted from the aqueous solution with a water-immiscible solvent such as ethyl ether. The ether extracts are then evaporated to produce a crude mixture containing the β-methylcrotonaldehyde. This crude product can then be subjected to fractional distillation in order to obtain the β-methylcrotonaldehyde in pure form.

The β-methylcrotonaldehyde may be identified by preparing various characteristic derivatives thereof such as the semicarbazone, or the dinitrophenylhydrazone in accordance with methods known in the art.

The following examples serve to exemplify specific embodiments of our invention.

*Example 1*

A solution of 76 g. (0.4 mole) of ethyl β,β-diethoxypropionate in 100 cc. of anhydrous ether was added dropwise with stirring at 0–10° C. to a solution of 1 mole of methyl magnesium iodide prepared from 24 g. of magnesium and 150 g. of methyl iodide in 500 cc. of anhydrous ether. After addition was complete, the reaction mixture, which consisted of two phases, was allowed to stir for 1–2 hours at room temperature. During this period the reaction mixture became nearly homogeneous. The reaction product was decomposed by pouring the mixture onto ice, and a saturated aqueous ammonium chloride solution added to dissolve the precipitated salts. The reaction mixture was then extracted thoroughly with ether and the ether extracts washed successively with aqueous sodium bicarbonate solution and water and dried over anhydrous sodium sulfate. Evaporation of the ether in vacuo afforded 68–70 g. of lemon-colored oil containing β-hydroxyisovaleraldehyde diethyl acetal.

A solution of 25 g. of this oil in 25 ml. of ethanol was treated with 100 cc. of 3% aqueous sulfuric acid. The homogeneous solution was warmed (60–80° C.) 4–5 minutes on a steam bath until turbidity developed and was then allowed to stand at room temperature overnight. The reaction product, possessing an upper oily layer, was diluted with an equal volume of water, saturated with sodium chloride, and thoroughly extracted with ether. The ether extracts were washed with aqueous sodium bicarbonate until neutral and dried over anhydrous magnesium sulfate. Evaporation of the ether and fractional distillation of the residue in a stream of nitrogen afforded 4.8–5 g. of β-methylcrotonaldehyde having a boiling range of 130–135° C. A small portion of this product was reacted with semicarbazide to produce the semicarbazone of β-methylcrotonaldehyde in accordance with conventional procedures. The semicarbazone crystallizes from methanol in the form of needles melting at 222–223° C. and having an absorption maximum, $\lambda$ max. 2700, $E_{1cm}^{1\%} = 2270$ (in ethanol)

*Example 2*

A solution of 0.5 g. of oil containing β-hydroxyisovaleraldehyde diethyl acetal, prepared as described in Example 1, in 5 cc. of ethanol was treated with a solution of 0.4 g. of 2,4-dinitrophenylhydrazine in 10 cc. of ethanol containing 3 ml. of conc. sulfuric acid and 3 ml. of water. Upon being warmed (60–80° C.) several minutes on a steam bath, a copious crystallization of β-methylcrotonaldehyde-2,4-dinitrophenylhydrazone took place. After standing for several hours at room temperature the product was filtered and recrystallized from ethanol-ethyl acetate, thus affording 0.45–0.47 g. of the 2,4-dinitrophenylhydrazone of β-methylcrotonaldehyde in the form of glittering red needles melting at 184–185° C., and having an absorption maximum, $\lambda$ max. 3800 $E_{1cm}^{1\%} = 1050$ (in chloroform)

Analysis: Calc'd for $C_{11}H_{12}O_4N_4$: C, 50.00; H, 4.55; N, 21.21. Found: C, 50.17; H, 4.26; N, 21.21.

Various changes and modifications may be made in our invention, certain preferred embodiments of which are herein described, without departing from the scope thereof. It is our intention that such changes and modifications, to the extent that they are within the scope of the appended claims, will be construed as part of our invention.

We claim:

1. The process for preparing β-methylcrotonaldehyde which comprises intimately contacting an ester of the formula:

$(RO)_2CH-CH_2-COOR_1$ wherein R and $R_1$ are lower alkyl groups, with a methyl magnesium halide selected from the group consisting of methyl magnesium bromide and methyl magnesium iodide, treating the resulting reaction product with water to produce the corresponding β-hydroxyisovaleraldehyde dialkyl acetal, and treating said acetal with a strong non-oxidizing acid to produce β-methylcrotonaldehyde.

2. The process for preparing β-methylcrotonaldehyde which comprises intimately contacting ethyl β,β-diethoxy propionate with methyl magnesium iodide, decomposing the resulting reaction product with water to obtain β-hydroxyisovaleraldehyde diethyl acetal, and treating said acetal with a strong non-oxidizing acid to produce β-methylcrotonaldehyde.

3. The process for preparing β-methylcrotonaldehyde which comprises intimately contacting ethyl β,β-diethoxy propionate with methyl magnesium iodide, decomposing the resulting reaction product with water to obtain β-hydroxyisovaleraldehyde diethyl acetal, and treating said acetal with aqueous sulfuric acid to produce β-methylcrotonaldehyde.

4. The process for preparing β-methylcrotonaldehyde which comprises intimately contacting ethyl β,β-diethoxy propionate with methyl magnesium bromide, decomposing the resulting reaction product with water to produce β-hydroxyisovaleraldehyde diethyl acetal, and treating said acetal with a strong non-oxidizing acid to produce β-methylcrotonaldehyde.

5. In the process for preparing β-methylcrotonaldehyde, the step which comprises intimately contacting an ester of the formula:

$$(RO)_2CH—CH_2—COOR_1$$

wherein R and R₁ are lower alkyl groups, with a methyl magnesium halide selected from the group consisting of methyl magnesium bromide and methyl magnesium iodide, and treating the resulting reaction product with water to produce the corresponding β-hydroxyisovaleraldehyde dialkyl acetal.

6. In the process for preparing β-methylcrotonaldehyde, the step which comprises intimately contacting ethyl β,β-diethoxy propionate with methyl magnesium iodide, and decomposing the resulting reaction product with water to produce β-hydroxyisovaleraldehyde diethyl acetal.

7. In the process for preparing β-methylcrotonaldehyde, the step which comprises intimately contacting ethyl β,β-diethoxy propionate with methyl magnesium bromide, and decomposing the resulting reaction product with water to produce β-hydroxyisovaleraldehyde diethyl acetal.

8. The process for preparing β-methylcrotonaldehyde which comprises reacting a compound of the formula:

$$(RO)_2CH—CH_2—\underset{\underset{\displaystyle OH}{|}}{C}(CH_3)_2$$

wherein R is a lower alkyl group, with a strong non-oxidizing acid.

9. The process for preparing β-methylcrotonaldehyde which comprises reacting β-hydroxyisovaleraldehyde diethyl acetal with aqueous sulfuric acid, and recovering β-methylcrotonaldehyde from the reaction product.

NORMAN L. WENDLER.
HARRY L. SLATES.

REFERENCES CITED

The following references are of record in the file of this patent:

UNITED STATES PATENTS

| Number | Name | Date |
|---|---|---|
| 2,175,556 | Cox | Oct. 10, 1939 |

OTHER REFERENCES

Gilman, Organic Chem., volume 1, page 502, Second Edition, 1947, John Wiley and Sons, New York.

Karrer, Organic Chem., page 151, Third English Edition, 1947, Elseier Publication Co., Inc., New York.

Eastman Kodak Co., Synthetic Org. Chemicals, vol. VI, Number 5, July 1933, page 2.